J. G. PUTNAM.
Corn Sheller.
No. 28,440.  Patented May 22, 1860.
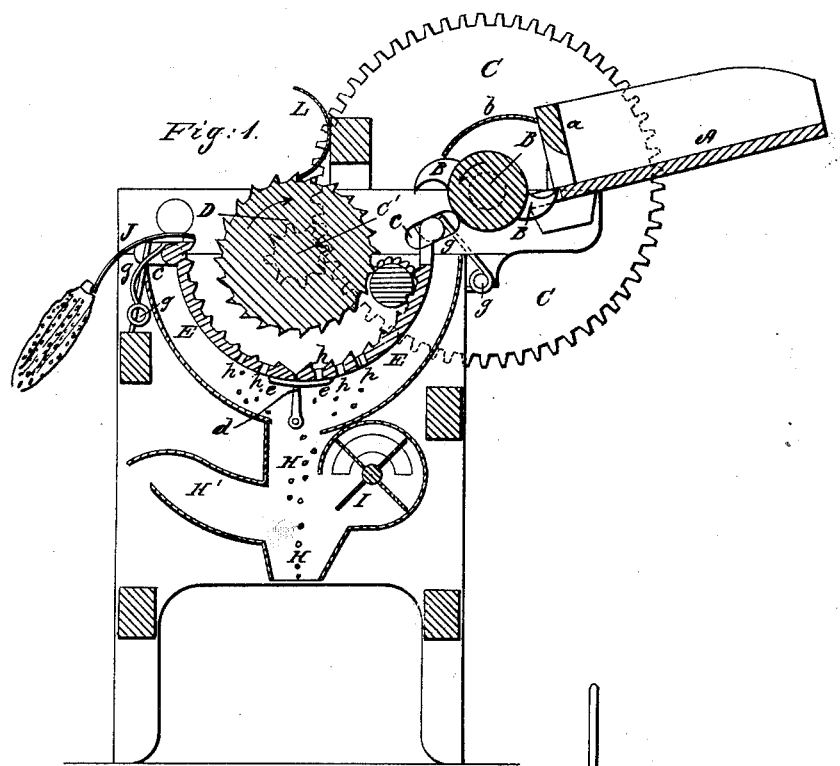
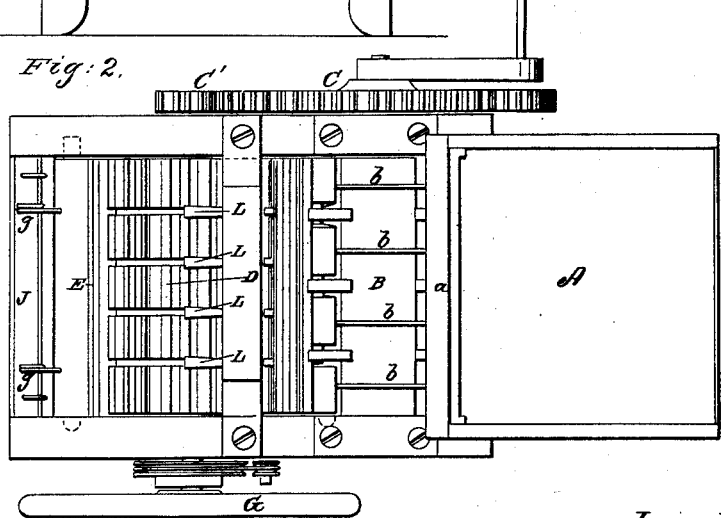

UNITED STATES PATENT OFFICE.

J. G. PUTNAM, OF TIOGA, PENNSYLVANIA, ASSIGNOR TO HIMSELF AND J. SCHIEFFLEIN, JR., OF SAME PLACE.

IMPROVEMENT IN CORN-SHELLERS.

Specification forming part of Letters Patent No. 28,440, dated May 22, 1860.

*To all whom it may concern:*

Be it known that I, J. G. PUTNAM, of Tioga, in the county of Tioga and State of Pennsylvania, have invented a new and useful Improved Corn-Sheller; and I do hereby declare that the following is a full, clear, and exact description thereof, reference being had to the accompanying drawings, forming a part of this specification, in which—

Figure 1 represents a vertical longitudinal section taken through my corn-sheller, showing the several parts employed and their relative arrangement with each other for shelling the grain from the cob and for blowing away the hulls as the grain falls from the machine. Fig. 2 is a top or plan view of my machine.

Similar letters of reference indicate corresponding parts in both figures.

To enable those skilled in the art to fully understand my invention, I will proceed to describe its construction and operation.

In the drawings, A represents an inclined trough or hopper, from which the ears of corn are taken to be carried or fed down between the hopper and concave. This trough has a head *a* in its lower end, which extends across the same and allows the ears to pass under it and to be received by a rotary feeder B, which feeder is a shaft furnished with two or more rows of curved teeth arranged diametrically opposite each other on the shaft B. This shaft receives a comparatively slow motion from a large toothed wheel C. Above the feeding-shaft B are arranged curved elastic prongs *b b*, which project out from the head *a* over the shaft B and between each tooth of this shaft. Now as the shaft B rotates in the direction of the arrow represented in Fig. 1 the ears of corn in the hopper A, which are held against this shaft by their own gravity, are taken by the curved teeth on the shaft and drawn up under the prongs *v*, which keep the ears close against the teeth, and at the same time prevent the teeth from drawing away from the hopper too many ears at one time. The prongs *b* also serve very effectually to present the corn properly to the shelling-cylinder. After the ears of corn leave the feeder, as just described, they are received between the shelling-cylinder D and concave E, the surfaces of both of which are furnished with teeth or ribs resembling ordinary saw-teeth, or any other suitably-shaped shelling-teeth if found better adapted to this purpose may be used. The cylinder D has its bearings in the sides of the machine and is rotated by the wheel C, which engages with a pinion C' on its shaft. The motion of this cylinder is regulated or equalized by a balance-wheel G on the opposite end of its shaft to pinion C'. This cylinder turns in the direction of the arrows indicated thereon in Fig. 1.

The concave E is semi-cylindrical and separated into two semi-cylindrical parts, each of which is hung in slots C in the frame of the machine, as clearly shown by Fig. 1. These halves are then held together at their lower ends by straight springs *d*, which press upward against strips *e*, which are secured to the bottom of one portion of the concave and project pretty well under the other. The springs *d* act up against the strips *e* with sufficient force to keep them together and to allow them to give slightly and adapt themselves to the different-sized ears of corn which pass through the machine to be shelled. The four ends of the concave which are supported in the slots *c* are acted upon, so as to force them toward the shelling-cylinder, by springs *g*, similar to those lettered *d*. The concave is thus made yielding. Still it is held against the ears with sufficient force to effect the shelling perfectly from the points to the butts of the ears. The shelled corn or the grains pass out through perforations *h*, through the bottom of the concave, and is conducted down through a channel H to the point of discharge. While it is thus being conducted away from the machine it receives a blast of air from fan I, and the dust, hulls, &c., are blown out through the channel H'. The corn is thus received free of extraneous matter into a suitable receiver placed under the spout H.

The cobs, after the grain is removed, are discharged over a curved guard-plate J; but on account of the swift motion of the shelling-cylinder they would be very apt to be carried over the cylinder and delivered back again into the mouth of the machine, thus passing again through the machine, and to obviate this I have arranged a number of curved guards L over the shelling-cylinder, the lower ends of which press in annular grooves in said cylinder. These effectually prevent the cobs from being carried over the cylinder.

The fan I is set in motion by a band, which passes over a grooved pulley on the shelling-cylinder shaft.

Having thus described my invention, what I claim, and desire to secure by Letters Patent, is—

The arrangement of the divided yielding perforated concave E, feeder B, prongs $b$, guard-plate J, guard L, and shelling-cylinder D, as and for the purpose herein shown and described.

J. G. PUTNAM.

Witnesses:
 WELLS UTLEY,
 B. B. BORCHER.